(12) United States Patent
Gutscher

(10) Patent No.: US 10,835,946 B2
(45) Date of Patent: Nov. 17, 2020

(54) METHOD FOR PRODUCING A CLAMPING RING

(71) Applicant: HUGO BENZING GMBH & CO. KG, Korntal-Münchingen (DE)

(72) Inventor: Horst Gutscher, Leonberg (DE)

(73) Assignee: HUGO BENZING GMBH & CO. KG, Korntal-Münchingen (DE)

( * ) Notice: Subject to any disclaimer, the term of this patent is extended or adjusted under 35 U.S.C. 154(b) by 537 days.

(21) Appl. No.: 15/521,830

(22) PCT Filed: Oct. 28, 2015

(86) PCT No.: PCT/EP2015/075043
§ 371 (c)(1),
(2) Date: Apr. 25, 2017

(87) PCT Pub. No.: WO2016/066720
PCT Pub. Date: May 6, 2016

(65) Prior Publication Data
US 2017/0246675 A1     Aug. 31, 2017

(30) Foreign Application Priority Data

Oct. 29, 2014   (DE) .................. 10 2014 115 727

(51) Int. Cl.
*B21D 53/16*   (2006.01)
*B21D 22/04*   (2006.01)
(Continued)

(52) U.S. Cl.
CPC ............. *B21D 53/16* (2013.01); *B21D 22/04* (2013.01); *B21D 28/10* (2013.01); *B21D 28/16* (2013.01);
(Continued)

(58) Field of Classification Search
CPC ........ B21D 22/02; B21D 22/04; B21D 28/02; B21D 28/14; B21D 28/16; B21D 35/001;
(Continued)

(56) References Cited

U.S. PATENT DOCUMENTS

| | | |
|---|---|---|
| 3,402,436 A | 9/1968 | Oetiker |
| 2003/0059251 A1 | 3/2003 | Engel |

(Continued)

FOREIGN PATENT DOCUMENTS

| | | |
|---|---|---|
| CH | 437 926 A | 6/1967 |
| DE | 26 08 870 C2 | 12/1985 |

(Continued)

OTHER PUBLICATIONS

Boschetto, A., Deburring of sheet metal by barrel finishing, Jul. 15, 2007, Trans Tech Publications Ltd, vol. 344, pp. 193-200 (Year: 2007).*

*Primary Examiner* — Shelley M Self
*Assistant Examiner* — Katie L. Parr
(74) *Attorney, Agent, or Firm* — Pauley Erickson & Swanson

(57) ABSTRACT

A method for producing a clamping ring in which pins that protrude in the region of or near a ring contour are formed on the top and bottom surfaces of a flat sheet metal material and after the ring contour is cut out, burrs that are produced during the cutting are removed by a deburring process. Advantages for the machining of the clamping ring are achieved if before a finish cutting by a complete cutting-out of the ring contour that is carried out from the one side of the flat sheet metal material, the ring contour is partially cut out from the other side in the vicinity of or near the pin protruding from this other side.

19 Claims, 2 Drawing Sheets

(51) Int. Cl.
*B21D 28/16* (2006.01)
*B21D 53/18* (2006.01)
*B21D 28/10* (2006.01)
*B21D 35/00* (2006.01)
*F16B 21/18* (2006.01)

(52) U.S. Cl.
CPC ........... *B21D 35/001* (2013.01); *B21D 53/18* (2013.01); *F16B 21/18* (2013.01); *F16B 21/183* (2013.01); *F16B 21/186* (2013.01)

(58) Field of Classification Search
CPC ........ B21D 53/16; B21D 53/18; B21D 22/20; B21D 22/206; B21D 28/10; Y10T 29/49996; Y10T 29/5182; Y10T 83/0581
USPC ......... 72/333, 336, 337, 338, 339, 340, 342, 72/352
See application file for complete search history.

(56) References Cited

U.S. PATENT DOCUMENTS

| | | | | |
|---|---|---|---|---|
| 2007/0211973 | A1* | 9/2007 | Rode | B25B 27/062 |
| | | | | 384/448 |
| 2008/0098788 | A1* | 5/2008 | Taniguchi | B21D 28/16 |
| | | | | 72/336 |
| 2014/0325840 | A1* | 11/2014 | Morgan | F02F 1/004 |
| | | | | 29/888.061 |

FOREIGN PATENT DOCUMENTS

| | | |
|---|---|---|
| EP | 1 156 896 B1 | 11/2001 |
| WO | WO 83/03211 A1 | 9/1983 |
| WO | WO 00/50183 A1 | 8/2000 |

\* cited by examiner a)  b)

METHOD FOR PRODUCING A CLAMPING RING

BACKGROUND OF THE INVENTION

Field of the Invention

This invention relates to a method for producing a clamping ring in which pins that protrude in the region of a ring contour are formed on the top and bottom surfaces of a flat sheet metal material and after the ring contour has been cut out, burrs that are produced during the cutting are removed by a deburring process.

Discussion of Related Art

It is assumed, without written proof, that such a method for producing a clamping ring with pins protruding on opposite sides is known. Frequently, clamping rings of this kind with pins in the region of the cut edges, sharp-edged places are still present on the clamping ring despite a deburring treatment.

European Patent Reference EP 1 156 896 B1 discloses a locking ring made of a rolled-up piece of metal band with two ends, one of which has recesses and the other of which has projections that can be inserted into these recesses.

German Patent Reference DE 26 08 870 C2 discloses a press tool for non-cutting production of a clamping ring.

Swiss Patent Reference CH 437 926 A discloses a method for producing a clamping ring.

SUMMARY OF THE INVENTION

The above and other objects are attained by features described in this specification and in the claims. In this case, before a finish cutting by a complete cutting-out of the edge contour that is carried out from the one side of the flat sheet metal material, the ring contour is partially cut out from the other side in the vicinity of or near the pin protruding from this other side.

As experiments conducted by the inventors demonstrate, a sharp-edged burr remains on the ring contour in the region of a protruding pin. The burrs are generally produced when cutting along the ring contour, on the second side of the clamping ring in the cutting direction on which the cutting tool emerges, such as during stamping. When there are clamping rings pins that protrude on the two opposing sides, such as on the bottom surface and the top surface, the edge region around the protruding pins is relatively difficult to access for the deburring treatment so that the deburring process is frequently insufficient in these regions. For example, when deburring is carried out using barrel-finishing stones, the burr can only be inadequately removed because the pin protruding in this region impairs the ability of the stones to effectively round the edges. With the described measures, however, the cutting edge in the two edge regions around the two pins is shifted to the side of the clamping ring opposite from the protruding pin so that the cutting burr can be effectively removed without the pins hampering the deburring process as they do, for example, in barrel finishing.

In one embodiment of this invention, the execution of the method includes that a clamping ring with a gap is produced in which a respective pin is formed at each of the two end sections of the clamping ring adjacent to the gap, protruding from opposite sides of the ring.

Advantageous production steps are achieved if the clamping ring is produced from plate-like sheet metal material and the pins are formed by punching.

It is also advantageous for the production if the partial cutting out and finish cutting are carried out from opposite sides by stamping.

Another advantageous embodiment of the method of this invention includes the fact that the clamping ring is hardened after the finish cutting.

Another advantageous procedure is for the deburring process to be carried out after the hardening.

For the production of the clamping ring, it is also advantageous for the deburring process to be carried out by barrel-finishing stones. It is thus possible to efficiently deburr a large number of clamping rings with a high processing quality.

BRIEF DESCRIPTION OF THE DRAWINGS

This invention is explained in greater detail below in view of exemplary embodiments and with reference to the drawings, wherein.

DETAILED DESCRIPTION OF THE INVENTION

Figure 1:
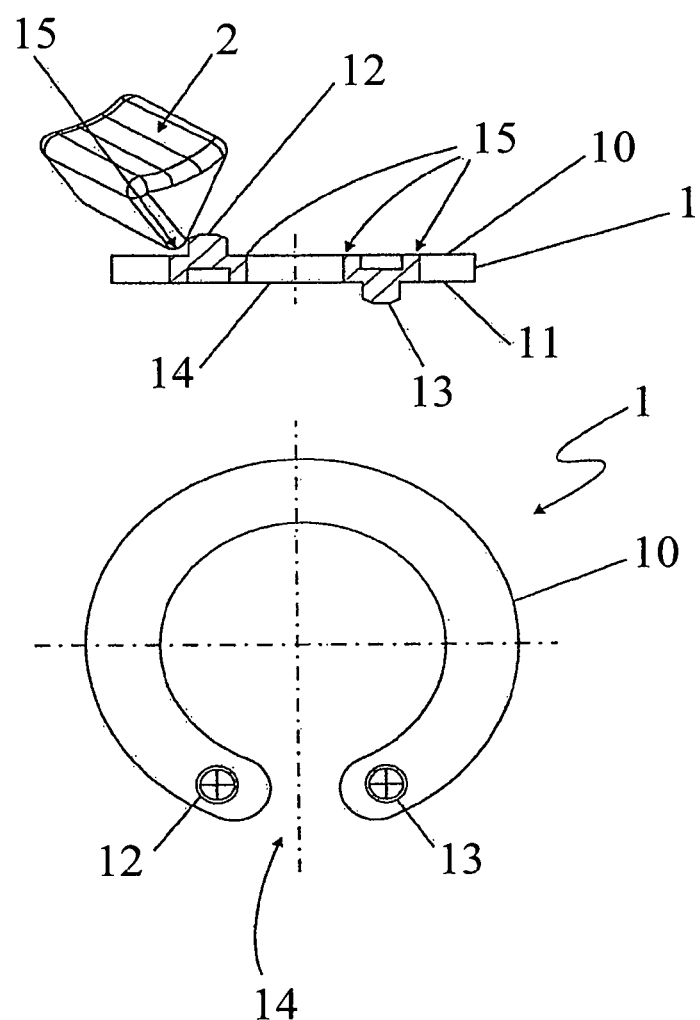
FIG. 1 shows a clamping ring with pins protruding from two opposing sides, in a top view and in a cross-sectional view in the vicinity of or near the pins, with a schematic depiction of a deburring process.

FIG. 1 shows a clamping ring 1 with a gap 14 between two end sections oriented toward each other so that the two resulting legs of the clamping ring 1 can be deflected inward or outward in opposition to their spring elasticity with enough force to produce the desired stress. In the two end sections oriented toward each other in the gap region, on the opposite sides of the clamping ring 1, namely on the top side 10 of the one and on the bottom side 11 of the other, a protruding top pin 12 and bottom pin 13 are formed, for example by punching, or for example through insertion of a separate pin into a hole. By providing the two pins on the opposite sides of the clamping ring 1, it is possible for parts that are attached to the opposite sides of the clamping ring 1, such as partial gears, to be prestressed against each other in the rotation direction in order to minimize gear play.

For example, the clamping ring 1 is cut out from a flat sheet metal material or a sheet metal plate made of a suitable metal such as steel, in particular by stamping. In the process of this, relatively sharp-edged burrs 15 are produced on the side toward the front or the back in the cutting direction or stamping direction at which the cutting tool emerges from the sheet metal material along the stamping contour or edge contour, as is evident from the cross-sectional view shown at the top in FIG. 1. In the region of or near the protruding pin 12 on the same side as the burr 15, such as on the top 10 in the example shown, the burrs 15 around the edge are not freely accessible to the deburring means such as barrel-finishing stones 2 during the deburring by barrel-finishing so that the deburring in this region is often insufficient.

Figure 2:
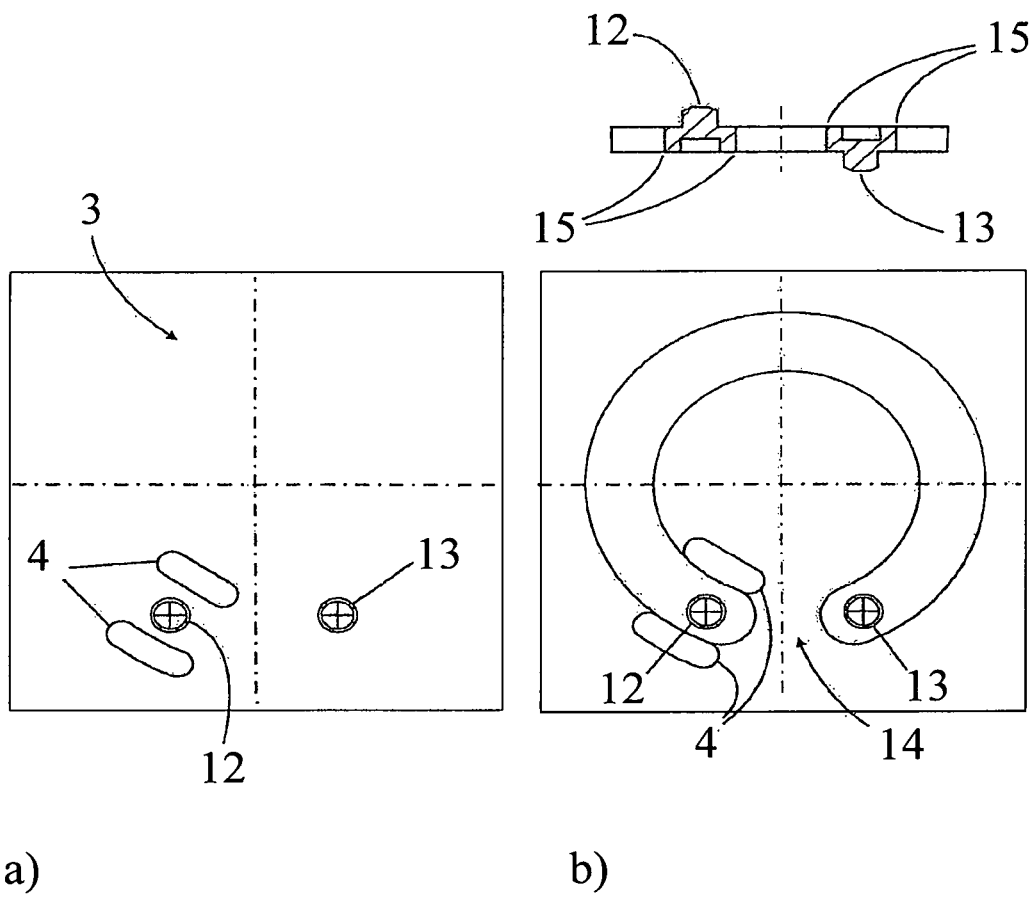
FIG. 2 shows various production steps in the production of a clamping ring with pins protruding from two opposing sides, with two top views and a cross-sectional view in the vicinity of or near the pins, using a procedure according to this invention.

With the procedure according to this invention shown in FIG. 2, before the complete cutting out or finish cutting, such as by stamping, an additional cutting step, namely a cutting-out 4, is first carried out from the other side of the sheet metal plate 3 in the contour region close to the relevant pin 12. As a result, in the closer and closest region of the pin 12, the cutting burr is also produced on the opposite side so that in this region as well, the burr 15 that is produced by cutting can be removed unhindered in the subsequent deburring.

After the cutting-out step, the clamping ring 1 is cut completely, such as finish-cut, from the sheet metal material or sheet metal plate 3, from the opposite side, as shown in the cutting sequence a) and b) in FIG. 2. The successive steps of the cutting-out 4 and the finish cutting can be carried out with cutting tools from opposite sides of the sheet metal plate 3 or from the same side of the sheet metal plate 3 in which case after the cutting-out 4, the plate is turned over and supplied to the cutting tools for the finish cutting. As the cross-sectional depiction in FIG. 2 shows, in the vicinity of or near the pin, the burrs 15 are situated or positioned on the opposite side of the clamping ring 1 from the pins, the ring being stamped, for example, out of the flat sheet metal material.

In an advantageous production method, the clamping rings 1 that are cut from the metallic sheet material are hardened and then deburred, for which purpose they undergo a barrel-finishing process using barrel-finishing stones 2.

The invention claimed is:

1. A method for producing a clamping ring (1) by cutting a ring contour from a flat sheet metal material (3), in which a first pin within the ring contour protrudes on a first side of the flat sheet metal material (3) and a second pin within the ring contour protrudes on an opposite second side of the flat sheet metal material (3), the method comprising
    a first cutting step of partially cutting out the ring contour from the first side along a first section of the ring contour flanking the first pin (12 or 13) protruding from the first side, thereby producing a burr on the second side of the flat sheet metal material (3) along the first section; and
    a second cutting step of a finish cutting of a complete cutting-out of the ring contour carried out along a remaining second section of the ring contour from the second side of the flat sheet metal material (3), thereby producing a burr on the first side of the flat sheet metal material (3).

2. The method of claim 1, wherein the first cutting step comprises cutting out the ring contour from the first side along each of opposing sides of the first pin (12 or 13).

3. The method of claim 2, wherein the first cutting step produces two cut-outs (4) on opposing sides of the pin (12 or 13) and the second cutting step comprises the finish cutting along the ring contour from the second side of the flat sheet metal material (3) to connect the two cut-outs (4).

4. The method of claim 1, further comprising removing burrs (15) produced during each of the first and second cutting steps by a deburring process.

5. The method of claim 4, further comprising:
    deburring on the first side along the first section of the ring contour flanking the first pin; and
    deburring the remaining second section of the ring contour on the second side.

6. The method according to claim 4, wherein the clamping ring (1) is hardened after the finish cutting.

7. The method according to claim 6, wherein the deburring process is carried out after the hardening.

8. The method according to claim 7, wherein the deburring process is carried out by barrel-finishing stones (2).

9. The method according to claim 1, wherein the clamping ring (1) includes a gap wherein a respective pin (12, 13) is formed at each of the two end sections of the clamping ring (1) adjacent to the gap, protruding from opposite sides of the ring.

10. The method according to claim 9, wherein the clamping ring (1) is produced from a plate-like sheet metal material (3) and the first and second pins (12, 13) are formed by punching.

11. The method according to claim 10, wherein the partially cutting out and finish cutting are carried out by stamping of the flat sheet metal material from opposite sides.

12. The method according to claim 11, wherein the clamping ring (1) is hardened after the finish cutting.

13. The method according to claim 12, wherein a deburring process is carried out after the hardening.

14. The method according to claim 13, wherein the deburring process is carried out by barrel-finishing stones (2).

15. The method according to claim 1, wherein the clamping ring (1) is produced from a plate-like sheet metal material (3) and the pins (12, 13) are formed by punching.

16. The method according to claim 1, wherein the partially cutting out and finish cutting are carried out by stamping of the flat sheet metal material from opposite sides.

17. The method according to claim 1, wherein the clamping ring (1) is hardened after the finish cutting.

18. The method according to claim 17, wherein a deburring process is carried out after the hardening.

19. The method according to claim 18, wherein the deburring process is carried out by barrel-finishing stones (2).

* * * * *